United States Patent
Morin et al.

(10) Patent No.: US 12,388,393 B2
(45) Date of Patent: Aug. 12, 2025

(54) DISTRIBUTED LOCKING TRACKER

(71) Applicant: Nextracker LLC, Fremont, CA (US)

(72) Inventors: Jacob Mark Morin, Phoenix, AZ (US); Abhimanyu Sable, Telangana (IN); Pradeep Kumar Dube, Telangana (IN)

(73) Assignee: NEXTRACKER LLC, Fremont, CA (US)

( * ) Notice: Subject to any disclaimer, the term of this patent is extended or adjusted under 35 U.S.C. 154(b) by 0 days.

(21) Appl. No.: 18/631,420

(22) Filed: Apr. 10, 2024

(65) Prior Publication Data

US 2024/0258962 A1   Aug. 1, 2024

Related U.S. Application Data

(63) Continuation of application No. 17/469,700, filed on Sep. 8, 2021, now Pat. No. 11,984,841.

(60) Provisional application No. 63/075,626, filed on Sep. 8, 2020.

(51) Int. Cl.
*H02S 20/32* (2014.01)
*F16C 11/04* (2006.01)

(52) U.S. Cl.
CPC .............. *H02S 20/32* (2014.12); *F16C 11/04* (2013.01)

(58) Field of Classification Search
CPC .......... H02S 20/32; H02S 20/10; F24S 30/40; F24S 30/425; F24S 50/20; Y02E 10/47; Y02E 10/50; F16C 11/04
See application file for complete search history.

(56) References Cited

U.S. PATENT DOCUMENTS

| | | |
|---|---|---|
| 5,454,277 A | 10/1995 | Imase |
| 6,073,503 A | 6/2000 | Matsuno et al. |
| 8,362,411 B1 | 1/2013 | Rau |
| 8,459,249 B2 | 6/2013 | Corio |
| 8,671,931 B2 | 3/2014 | Curtis et al. |
| 8,943,817 B2 | 2/2015 | Blitz et al. |
| 9,509,248 B2 | 11/2016 | Wu |
| 9,581,678 B2 | 2/2017 | Corio |
| 9,718,334 B2 | 8/2017 | Means |
| 9,806,669 B2 | 10/2017 | Michotte De Welle |
| 9,979,346 B2 | 5/2018 | Song et al. |
| 10,340,840 B2 | 7/2019 | Almy et al. |

(Continued)

FOREIGN PATENT DOCUMENTS

WO    2018009634 A1    1/2018

OTHER PUBLICATIONS

International Searching Authority "International Search Report and Written Opinion" From Application No. PCT/US21/49497, Dated Feb. 7, 2022, pp. 9.

(Continued)

*Primary Examiner* — Daniel J Wiley
(74) *Attorney, Agent, or Firm* — Fredrikson & Byron, P.A.

(57) ABSTRACT

A solar tracker including a torque tube, a plurality of bearings configured to receive the torque tube, a plurality of piers each configured to receive one of the plurality of bearings, and a lock-out device mounted on one of the plurality of piers and operatively associated with at least one of the plurality of bearings, the lock out device configured to periodically engage and disengage openings formed in the bearings to limit movement of the torque tube and to transfer load from the torque tube to the pier on which it is mounted.

21 Claims, 7 Drawing Sheets

(56) References Cited

U.S. PATENT DOCUMENTS

| | | |
|---|---|---|
| 10,584,902 B2 | 3/2020 | Ros Ruiz et al. |
| 10,605,489 B2 | 3/2020 | Worden |
| 10,944,354 B2 | 3/2021 | Ballentine et al. |
| 11,114,975 B2 | 9/2021 | Mukherjee et al. |
| 11,387,771 B2 | 7/2022 | Au et al. |
| 11,711,051 B2 | 7/2023 | Kresse et al. |
| 2008/0308091 A1 | 12/2008 | Corio |
| 2009/0226123 A1* | 9/2009 | Klein .................. F16C 17/10 384/294 |
| 2010/0319341 A1 | 12/2010 | Blitz et al. |
| 2011/0240006 A1 | 10/2011 | Linke et al. |
| 2011/0253195 A1 | 10/2011 | Kim |
| 2013/0039610 A1 | 2/2013 | Schneider et al. |
| 2014/0338659 A1 | 11/2014 | Corio |
| 2015/0207452 A1 | 7/2015 | Werner et al. |
| 2015/0234031 A1 | 8/2015 | Corio |
| 2016/0013751 A1 | 1/2016 | Michotte De Welle et al. |
| 2016/0190980 A1 | 6/2016 | Sun et al. |
| 2016/0218663 A1 | 7/2016 | Werner et al. |
| 2018/0073773 A1 | 3/2018 | Grushkowitz et al. |
| 2018/0091088 A1 | 3/2018 | Barton et al. |
| 2019/0052224 A1 | 2/2019 | Schatz et al. |
| 2019/0379323 A1 | 12/2019 | Au et al. |

OTHER PUBLICATIONS

European Patent Office "Extended European Patent Office" From Application No. 21867530.4, Dated Oct. 17, 2024, pp. 13.

* cited by examiner

DISTRIBUTED LOCKING TRACKER

CROSS-REFERENCE TO RELATED APPLICATIONS

This application is a continuation of U.S. patent application Ser. No. 17/469,700, filed on Sep. 8, 2021, which claims the benefit of and priority to, U.S. Provisional Patent Application No. 63/075,626, filed on Sep. 8, 2020, the entire contents of each of which is hereby incorporated by reference herein.

BACKGROUND

Technical Field

The present disclosure relates to solar power generation systems, and more particularly, to solar tracker systems for preventing damage caused by wind loading while maximizing electrical energy production.

Background of Related Art

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length.

Adjusting massive solar trackers requires power to drive the solar array as it follows the sun. As will be appreciated, the greater the load, the greater the amount of power necessary to drive the solar tracker. An additional design constraint of such systems is the rigidity required to accommodate the weight of the solar arrays and at times significant wind loading.

Further, the torsional excitation caused by wind loading exerts significant force upon the structure for supporting and the mechanisms for articulating the solar tracker. As such, increases in the size and number of components to reduce torsional excitation are required at varying locations along the length of the solar tracker. With these concerns in mind prior systems have typically driven the solar modules to a position where the loads created by the wind are reduced, but these typically come at the cost of energy production. For example, one methodology drives all of the solar trackers to a flat or 0 angle position relative to the ground. As can be appreciated, this significantly reduces the amount of energy being produced. The present disclosure seeks to address the shortcomings of prior tracker systems.

SUMMARY

One aspect of the disclosure is directed to a solar tracker including: a torque tube, a plurality of bearings configured to receive the torque tube, a plurality of piers each configured to receive one of the plurality of bearings. The solar tracker also includes a lock-out device mounted on one of the plurality of piers and operatively associated with at least one of the plurality of bearings, the lock out device configured to periodically engage and disengage openings formed in the bearings to limit movement of the torque tube and to transfer load from the torque tube to the pier on which it is mounted.

Implementations of this aspect of the disclosure may include one or more of the following features. The solar tracker further including a cam shaft driven synchronously with the torque tube. The solar tracker further including at least one cam mounted on the cam shaft and engaging the lock out device. The solar tracker where the cam includes a eccentric groove configured to receive a follower of the lock out device. The solar tracker where the follower is rigidly affixed to a shaft support. The solar tracker where the shaft support is mounted on the pier via a hinge. The solar tracker where one or more pins affixed to the shaft support are configured to engage one or more openings formed on the bearing. The solar tracker where, as the cam shaft and cam rotate, the follower which engages the eccentric groove causes the shaft support to rotate on the hinge causing the pins to engage with or disengage from the openings formed on the bearings. The solar tracker where a pier includes two lock-out devices configured to alternately engage and disengage from the openings in the bearing. The solar tracker where the bearing is a concentric bearing. The solar tracker where the bearing is a mass balanced bearing. Implementations of the described techniques may include hardware, a method or process, or computer software on a computer-accessible medium, including software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One aspect of the disclosure is directed to a lock out device for a solar tracker including: a shaft support. The lock also includes a hinge configured to connect the shaft support to a pier and allow the shaft support to rotate relative to the pier. The lock also includes a follower rigidly mounted on the shaft support. The lock also includes one or more pins configured to engage one or more openings on a bearing to limit rotation of the bearing.

Implementations of this aspect of the disclosure may include one or more of the following features. The lock out device where the follower is configured to be received within an eccentric groove of a cam. The lock out device where rotation of the cam applies force to the follower and causes the shaft support to move. The lock out device including a pair of shaft supports, each mounted on opposite sides of the pier by a hinge. The lock out device further including two cams, one each on opposite sides of the pier. The lock out device where each shaft support includes a follower configured to engage an eccentric groove of a cam located on a respective side of the pier. The lock out device where the two cams are mounted on a cam shaft. The lock out device where rotation of the cam shaft causes the eccentric groove formed in each cam to act on the follower and rotate the shaft support such that the pins on the shaft support engage with or disengage from the openings in the bearing. The lock out device where the eccentric grooves of the two cams causes the pins on the pair of shaft supports to alternately engage with and disengage from the openings in the bearing. Implementations of the described techniques may include hardware, a method or process, or computer software on a computer-accessible medium, including software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

BRIEF DESCRIPTION OF THE DRAWINGS

Various aspects of the present disclosure are described herein below with reference to the drawings, which are incorporated in and constitute a part of this specification, wherein.

DETAILED DESCRIPTION

Figure 1:
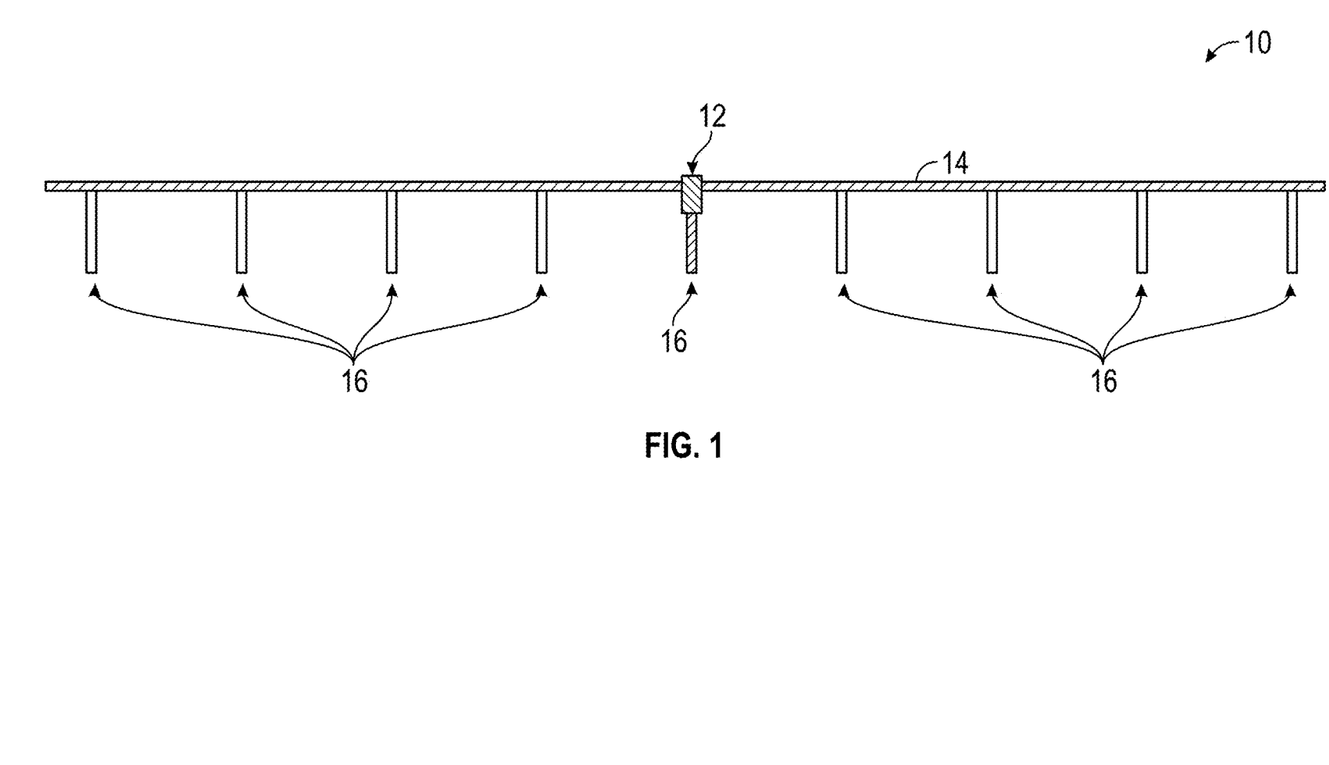
FIG. 1 depicts a side view of a solar tracker.

FIG. 1 depicts a traditional solar tracker 10. The solar tracker 10 includes a slew drive 12, connected to a torque tube 14. The torque tube 14 receives a series of rails (not shown) attached perpendicular to the torque tube 14 and upon which a number of photovoltaic solar modules are mounted. The solar tracker 10 also includes a number of piers 16 which are mounted in the ground on one end and typically include a bearing, for example bearing 20a or 20b (FIG. 3A or 3B) but without the lock-out mechanism described in greater detail below. The torque tube 14 is received in the bearings 20 and supported on the piers 16. The slew drive 12 (or other drive mechanism) drives the torque tube 14 and the attached solar modules in an effort to follow the sun as it translates from east to west across the sky.

When windy conditions are experienced, the solar modules act as a sail providing a face that opposes the wind. The force caused by the wind translates from the solar modules to the torque tube 14 and to the slew drive 12. Ultimately the force caused by the wind is translated to the ground by the pier 16 on which the slew drive 12 rests. Thus, the force of the wind collected along the very long solar tracker 10 is ultimately concentrated on a single pier 16. This necessitates the increase in size and weight of the slew drive 12 and its pier 16. Further, to prevent twisting of the torque tube 14 along its length, the size and weight of the torque tube 14 must also be increased.

Figure 2:
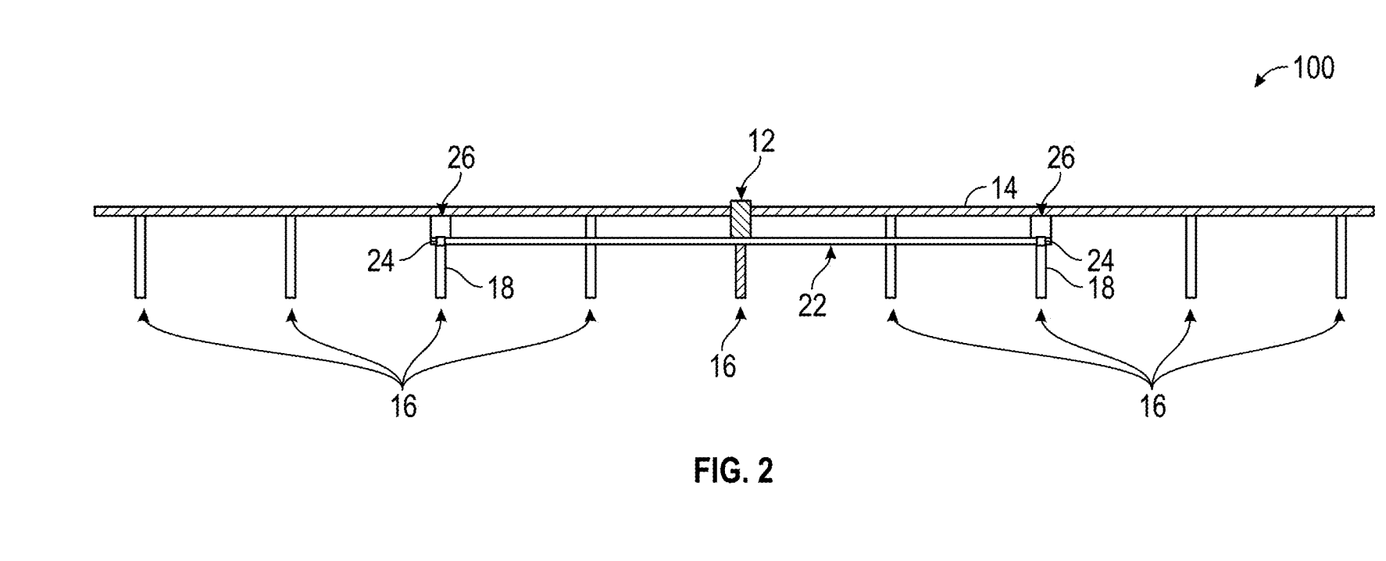
FIG. 2 depicts a side view of a solar tracker in accordance with the disclosure.

The instant disclosure is directed to a solar tracker having have multiple points of fixity in tracker 100 as shown in FIG. 2 that helps in preventing torsional instability at all wind speeds and all tracking inclinations. Multiple points of fixity over a length of tracker 100 creates favorable conditions for tracker 100 to be stowed, which in turn reduces the pressure load on the solar modules without compromising on structural stability of the tracker 100.

As depicted in FIG. 2, the solar tracker 100 includes a slew drive 12, a torque tube 14, and a plurality of piers 16. The piers 16, like those of FIG. 1 support a bearing (not shown) on each allowing for free rotation of the torque tube 14. Mechanically linked to the slew drive 12 is a cam shaft 22. The cam shaft may be gear driven or chain driven by the motor driving slew drive 12.

Figure 3A:
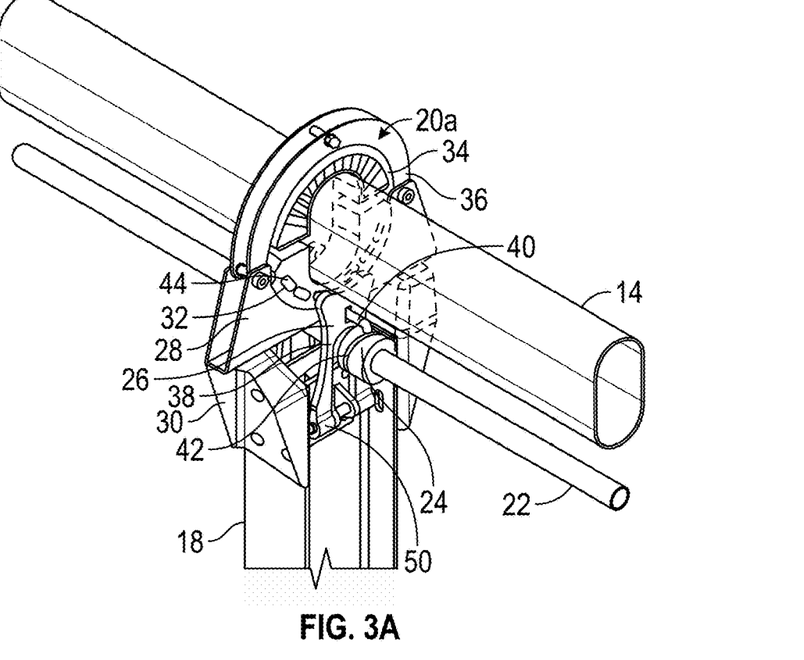
FIG. 3A depicts a perspective view of a solar tracker bearing fitted with a lock-out device in accordance with the disclosure.
Figure 3B:
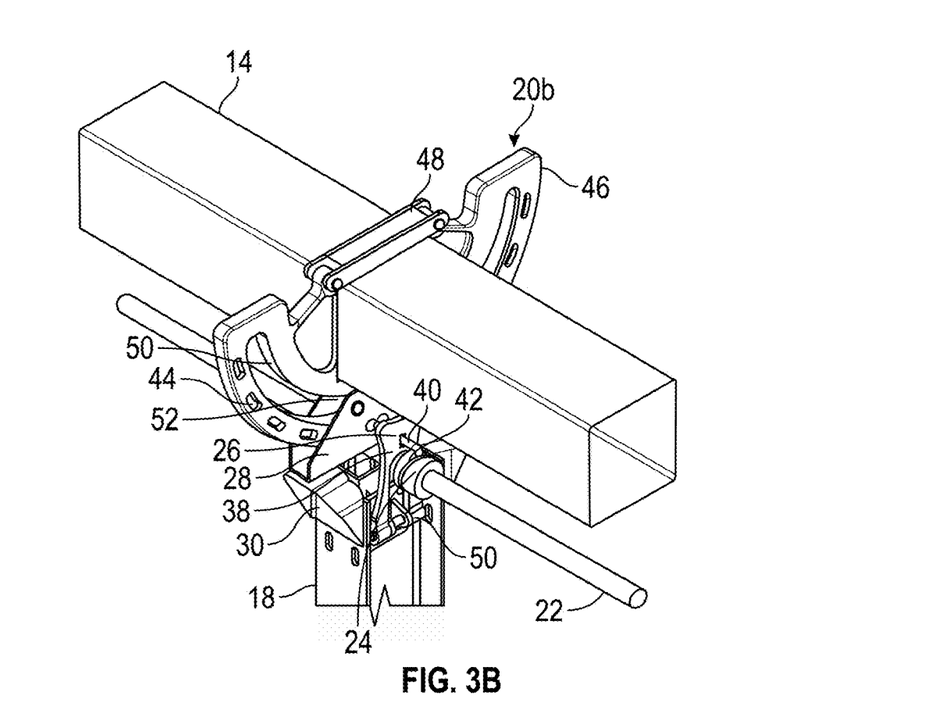
FIG. 3B depicts a perspective view of a solar tracker bearing fitted with a lock-out device in accordance with the disclosure.

Alternatively, the cam shaft may have a separate drive motor that is configured to drive synchronously drive the cam shaft 22. The cam shaft 22 is connected to cams 24, which are mechanically coupled to lock out devices 26 that made with the bearings 20a or 20b. By locking the bearings 20, the piers 18 which support the lock out devices 26, absorb a portion of any wind loading applied to the tracker 100. This absorption of the load at multiple points along the tracker 100 reduces the load at any one point on the tracker 100 and allow for reduced torque tube dimensions and weight as well as reductions in size of the slew drive. Further, this design enables the elimination of a damper which is typically employed to increase the rigidity of the tracker 100 in the torsional direction.

The lock-out device 26 of the disclosure can be deployed on both concentric bearings 20a (FIG. 3A) and mass balanced bearings 20b (FIG. 3B). With respect to the use on concentric bearings 20a, a bearing base 28 is bolted to a top portion of a pier 18 by brackets 30. The bearing base 28 receives a lower bearing half 32. The lower bearing holder 32 rests on a lubricating sheet (not shown). The torque tube 14 rests in the lower bearing half 32. An upper bearing half 34 is placed over the torque tube 14, and a bearing cap 36 is secured to the bearing base 28 with a lubricating sheet (not shown) there between. When the torque tube 14 is rotated, the upper and lower bearing halves 32, 34 rotate with the torque tube 14

The lock out device includes a shaft support 38 formed on both sides of the pier 18 and through which the cam shaft 22 passes. The shaft support 38 is fixed to the pier 18 using a hinge 50. The cam 24, one on both sides of the pier 18 is rigidly mounted on the cam shaft 22 and rotates with the cam shaft 22. A follower 40 extends from the shaft support 38 and rides in a groove 42 formed in the cam 24. The follower is rigidly attached to the shaft support 38, e.g., by welding. Protruding from the other side of the shaft support 38 are one or more pins 41. The pins 41 depending on the position of the cam 24, are configured to extend into openings 44 formed in the lower bearing half 32. Movement of the pins 41 into the openings 44 of the lower bearing half 32 locks the bearing 20a and prevents rotation of the torque tube 14, such as when wind loaded.

FIG. 3B depicts a similar lock-out device 26 used in conjunction with a mass balanced bearing 20b. Unlike the concentric bearing 20a, the mass balanced bearing 20b is not formed of two halves. Instead a housing 46 includes an opening configured to receive the torque tube 14. A locking mechanism 48 ensures that the torque tube 14 is secured in the opening. Below the opening, a slot 50 is formed in the housing 46 and may be semi-circular in shape extending under the torque tube 14. Rollers 52 are secured to the bearing base 28 and support the housing 46 and torque tube 14 secured therein. The openings 44 are formed in the housing 46 below the slot 50 and are configured to receive the pins 41 when forced into the opening in the shaft support 38 as the follower 40 is driven about the hinge 50 by the cam 24 on cam shaft 22.

Regardless of whether bearing 20a or 20b is employed, when the torque tube 14 is driven by a prime mover, such as the slew drive 12, the torque tube rotates about its axis within the bearing. The cam shaft 22 is also rotated at the same time and with predetermined velocity. The predetermined velocity is at a specific ratio to the speed of rotation of the torque tube 14 and the bearings 20a, 20b attached thereto. The rotation of the cam shaft 22 causes the cams 24 to rotate. The rotation of the cams 24 causes the followers 40 to move the shaft support 38 and thus force the pins 41 in and out of the openings 44 in the lower bearing half 32 or housing 46. The cams 24 are arranged so that the followers 41 on each side of the bearings 20a 20b are forced into the openings 44 in an alternating pattern. Due to the motion torque tube 14, and cam shaft 22 that moves synchronously therewith, followers 41 are inserted and removed from openings 44 in an alternating pattern. The insertion is in such a way that when, for example, a left follower 40 goes in, a right follower 40 moves out and thus when the right follower 40 is in, the left follower 40 is out. However, in at least one embodiment there will always be a follower 40 inserted into an opening 44 of the bearing 20a 20b. As will be appreciated, the tracker 100 is not truly locked in position but rather its motion caused by wind loading and other external forces is restricted to the size of the openings 44.

Thus, in accordance with the disclosure, when the torque tube 14 is driven by the slew drive 12 or another prime mover, the cam shaft 22 will rotate and the cam 24 will smoothly insert and remove the pins 41 from the openings 44. But, if the torque tube 14 tube is suddenly wind loaded or another force is applied seeking to rotate the torque tube 14, that rotation is prevented by the presence of the pins 41 in the openings 44. Movement of the torque tube 14, and therewith solar modules is limited to the range of motion afforded by the size of the openings 44. The load caused by the wind loading or other external force is absorbed by the pins 41 and transferred via the shaft supports 38 and hinge 50 of lock-out device 26 to the piers 18 and not into the bearings 20a, 20b. Further, this loading is shared over the number of lock-out devices 26 employed on the tracker 100. Only two are depicted in FIG. 2, however, there could be one on every pier, every other pier, or as many as needed to achieve the desired stiffness for the tracker 100. Regardless of the number employed, the overall stiffness of the tracker 100 is increased by the use of lock-out devices 26. By increasing the stiffness of the tracker 100 the size of the components such as the torque tube 14 and the slew drive (and the gearing associated with the drive) can be reduced resulting in cost savings in the construction of the solar tracker 100.

Another benefit of the tracker 100 employing lock-out devices 26 are improved energy production. Often wind loading is a temporary occurrence. As a result, there are times when despite prevailing wind loading at 10-15 MPH, gusts of 20, 25, 30 and higher gusts. In accordance with some wind loading protection schemes, when the observed wind speed exceeds a predetermined amount for a given period of time, the tracker 100 is rotated back to a 0 degree or some shallow angle position where the solar modules are substantially parallel to the ground, and the loading caused by the wind is substantially reduced. To achieve this the torque tube 14 must be rotated. This rotation uses energy, and depending on the wind direction, may further increase the loading on the slew drive 12. Further, when in this stowed position, whether 0, 10, or 20 degrees to horizontal, the energy production of the solar modules is substantially decreased. In contrast, in accordance with the disclosure, upon experiencing loading, the tracker 100 is locked in a position that is much closer to the desired position for the sun angle at that time. Thus, energy production is only slightly, if at all, impacted by the wind event. As will be appreciated, should the duration of the event or the speed of the wind necessitate, the slew drive 12 may still be employed to drive the tracker to a more desirable position. While doing so, because the pins 41 will always remain engaged with the openings 44, the loading on the tracker 100 remains borne by the piers 18 upon which the lock-out devices 26 are deployed. Further, where the wind loading is merely transitory, as is often the case, then the tracker 100 may continue to be driven as normal following a return to lesser wind conditions. These features may be further enabled by real time wind speed sensors deployed proximate the tracker 100 and one or more control algorithms employed to drive the slew drive 12 in accordance with detection of the ambient and expected meteorological and weather conditions.

Figure 4:
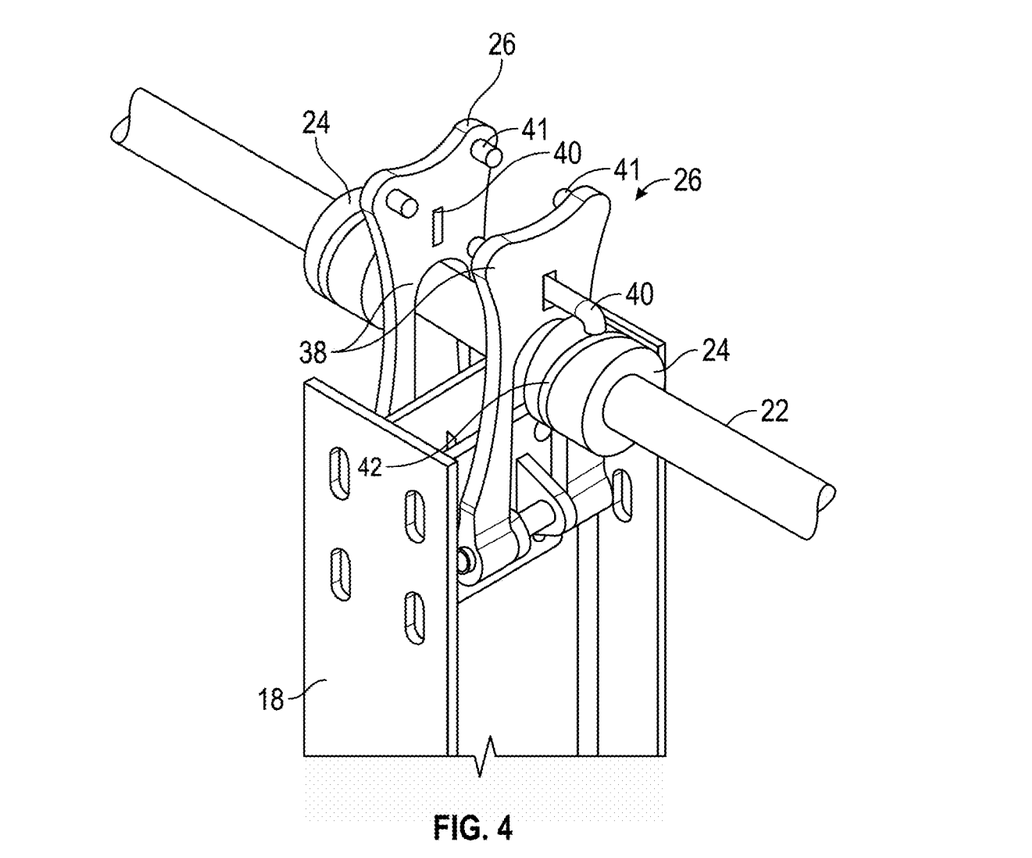
FIG. 4 depicts a perspective view a lock-out device in accordance with the disclosure.
Figure 5:
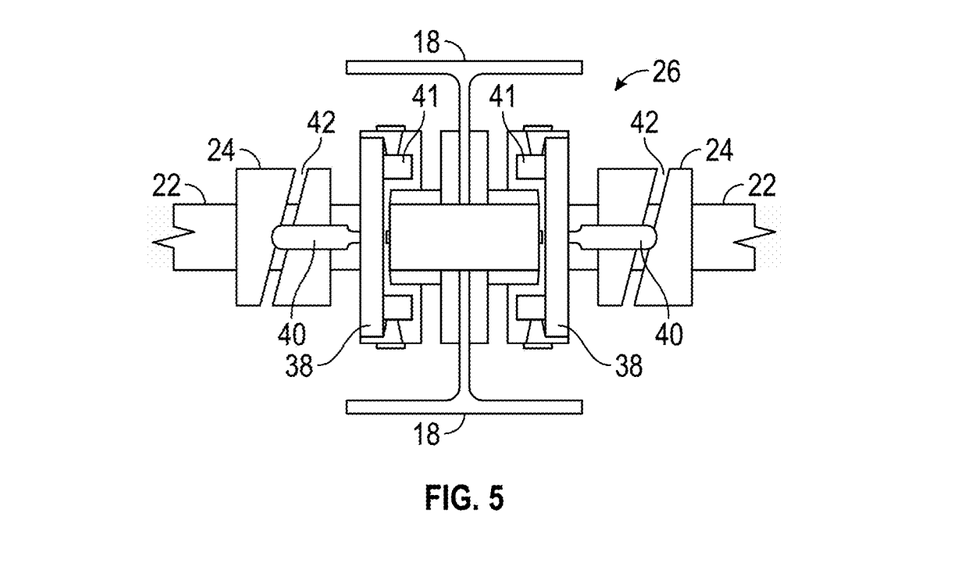
FIG. 5 depicts a top view of a lock-out device in accordance with the disclosure.

FIG. 4 depicts a perspective view of the lock-out device 26 mounted on a pier 18 with the bearing 20a, 20b removed for ease of identifying the components described above. FIG. 5 is a top view of the lock-out device 26 mounted on a pier 18 with the bearing 20a, 20b removed. As can be seen clearly in FIG. 5, the cam grooves 42 are eccentric, and substantially parallel to one another. These parallel grooves 42 enable the alternate movement of the followers 40 and thus the shaft supports 38 with pins 41.

Figure 6:
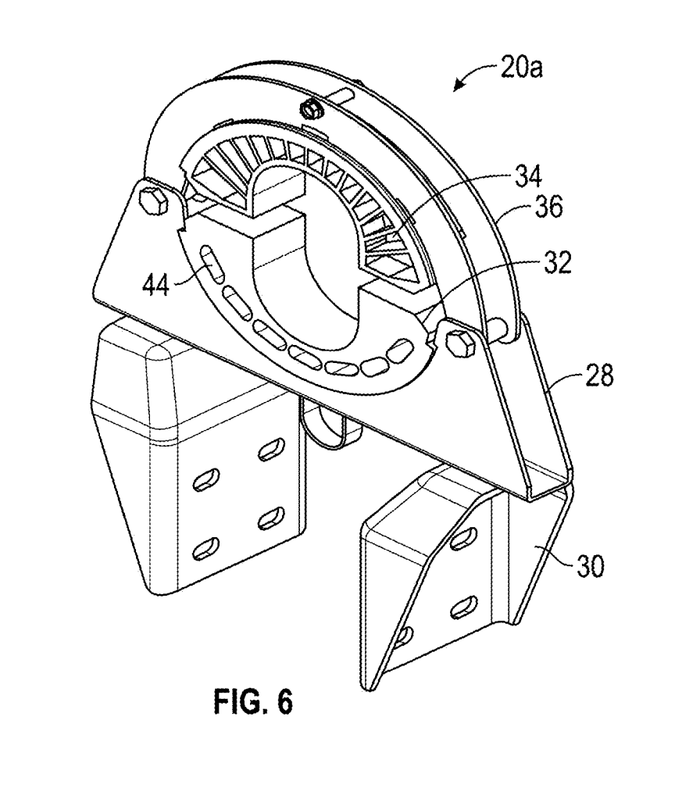
FIG. 6 depicts a perspective view of a solar tracker bearing in accordance with the disclosure.

FIG. 6 is a perspective view of a concentric bearing 20a with the locking mechanism 26 and the pier 18 removed. As can be clearly seen the bearing cap 36 is bolted to the bearing base 28 securing the upper and lower bearing halves 34 and 32 therebetween.

Figure 7:
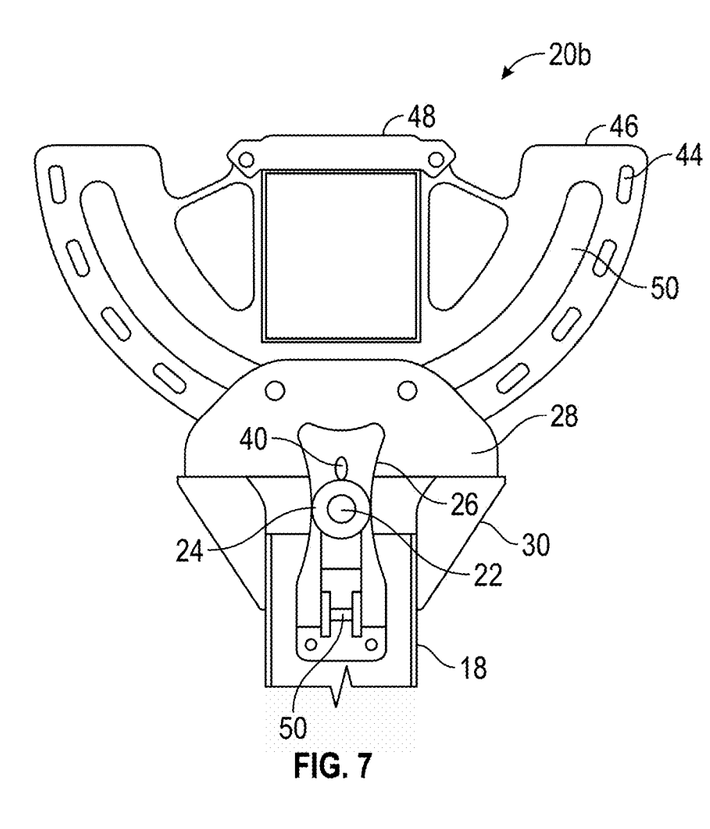
FIG. 7 depicts a side view of a solar tracker bearing fitted with a lock-out device in accordance with the disclosure.

FIG. 7 is a side view of a bearing 20b mounted on a pier 8 with the lock-out device 26 in place. This view shows a hinge 50, which allow the shaft supports 28 to rotate about it as the follower 40 traverses the groove 42 in the cam 24. Each shaft support 28 includes such a hinge 50. Accordingly, in at least one embodiment the pins 41 are rigidly mounted to the shaft supports 28 and as the follower 40 traverses the eccentric grove 42 in the cam 24 the shaft support 28 is forced to rotate on the hinge 50. The result of this motion is that pins 41 mounted on the shaft support 38 move in or out of the opening 44 in the bearing 20a, 20b. Further description of this movement is depicted with reference to FIG. 9, below.

Figure 8:
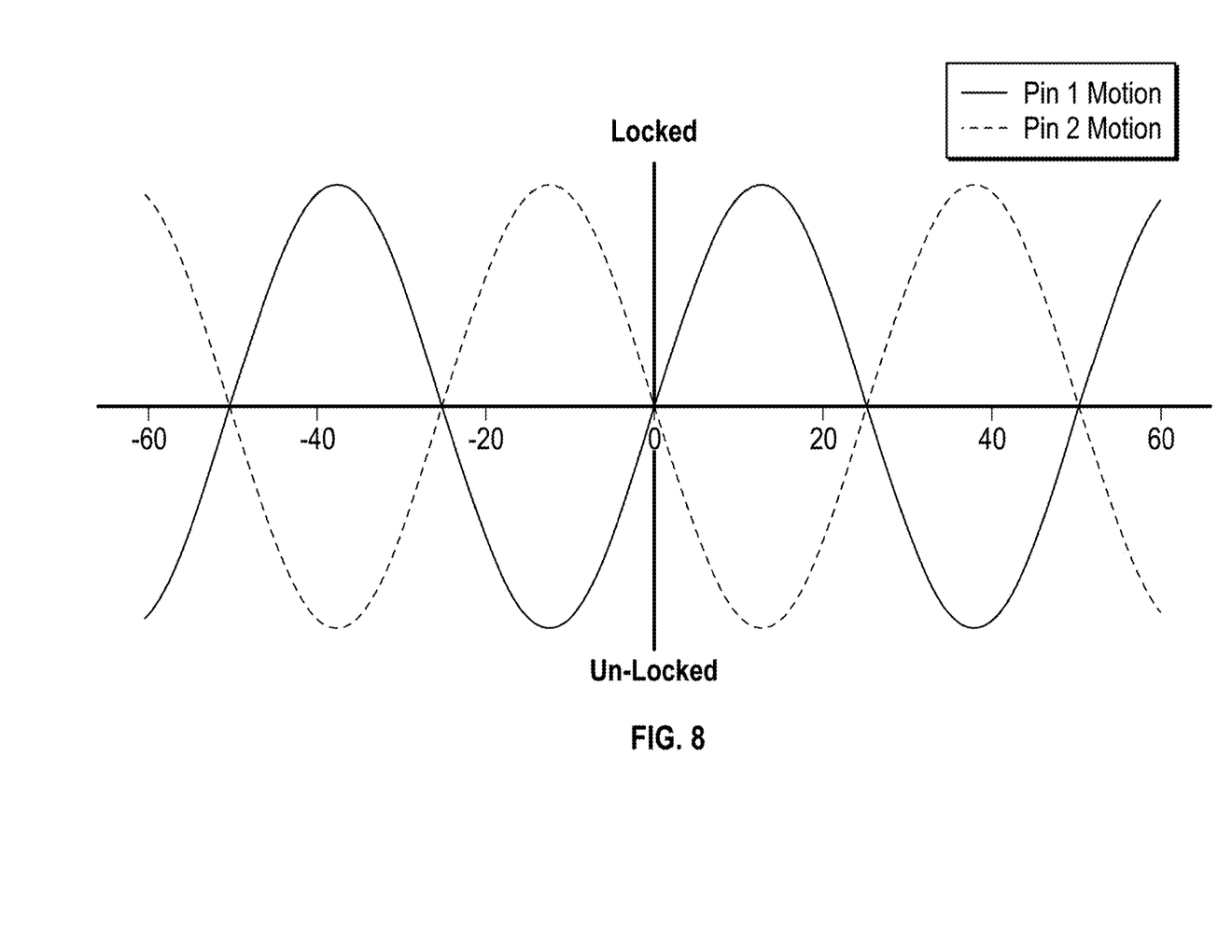
FIG. 8 is a graphical representation of the movement of pins of a lock-out device in accordance with the disclosure.

FIG. 8 depicts the cyclical motion of the pins 40 as they move in and out of opening 44 in bearings 20a or 20b. On the x-axis is the angular orientation of the torque tube 14 and the solar modules mounted there to. −60 on the x-axis represents a generally easterly orientation of the torque tube 14 and the solar modules mounted thereon, while 60 represents a generally westerly orientation. The torque tube transits, in this example 120 degrees of rotation from east to west. The pins 40 in this example are 180 degrees out of phase with one another such that as the torque tube 14 rotates, one follower 40 is moved from a locked position to an unlocked position, while the second pin is moving from an unlocked position to the locked position.

Figure 9:
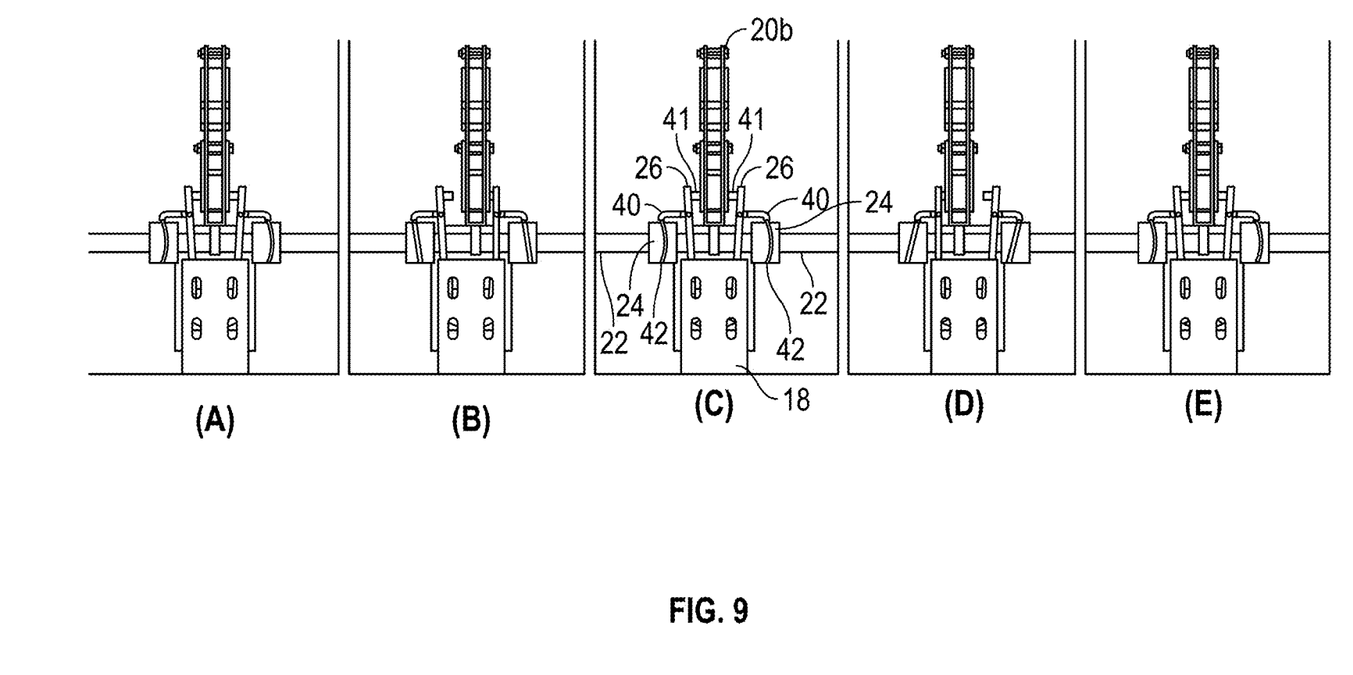
FIG. 9 depicts a series of frames showing the movement of portions of the lock-out device in relation to a solar tracker bearing in accordance with the disclosure.

FIG. 9 depicts the motion of the pins 41 into and out of the openings 44 in the housing of a bearing 20b. In frame (a) which may roughly correspond to about a −50-angle position in FIG. 8, the pins 41 from both shaft supports 28 are engaged with the openings 44 in the bearing 20b. Frame (b)

roughly corresponds to a −38 angle where the left pin 41 is completely disengaged or unlocked from the opening 44 in the bearing 20*b*, and the right pin 41 is fully engaged in the opening. Frame (c) roughly corresponds to about a −24 deg position which is similar to that depicted in frame (a), again with both sets of pins 41 engaged with the openings 44 in the bearing 20*b*. Frame (d) shows the opposite of frame (b) and the left pin 41 is now fully engaged or locked into the opening 44 of the bearing 20(*b*) while the right pin 41 is fully disengaged. This position in frame (d) roughly corresponds to a −12-degree angle for the torque tube 14 and solar modules mounted thereon. Once again, frame (e) mirrors frames (a) and (c) with the pins 41 both engaged with the openings 44. Thus, as noted above, the ability of the torque tube 14 to rotate either opposite or in furtherance of its driven position, by wind or any other outside force is limited by the size of the openings 44 and the presence of pins 41 in those openings.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed is:

1. A support assembly for a single-axis solar tracker comprising:
    a bearing assembly configured to receive and couple to an elongated torque tube, the bearing assembly enabling rotation of the elongated torque tube about the elongated torque tube's lengthwise axis;
    a bearing base configured to receive a first portion of the bearing assembly;
    a bearing cap couplable to the bearing base and configured to receive a second portion of the bearing assembly;
    a foundation component comprising an interconnected pair of opposing vertical flanges; and
    a pair of bearing support brackets, each bearing support bracket configured to attach to a corresponding opposing vertical flange of the pair of opposing vertical flanges, the pair of bearing support brackets providing a pair of substantially horizontal support surfaces for the bearing base.

2. The support assembly of claim 1, wherein the bearing base is generally U-shaped having a bottom surface extending between opposed vertical surfaces.

3. The support assembly of claim 1, wherein the second portion of the bearing assembly is different than the first portion of the bearing assembly.

4. The support assembly of claim 1, wherein the bearing cap is coupled to the bearing base via a first fastener on a first side and a second fastener on the second side opposite the first.

5. The support assembly of claim 4, wherein the bearing cap is rotatable about the first fastener on the first side or the second fastener on the second side when the other of the first fastener or the second fastener do not secure the bearing cap to the bearing base.

6. The support assembly of claim 4, wherein the bearing cap is removable coupled to the bearing base via the first fastener and the second fastener.

7. The support assembly of claim 1, wherein the bearing base defines a continuous planar bottom surface extending across a distance between the pair of bearing support brackets, the continuous planar bottom surface being substantially horizontal.

8. The support assembly of claim 7, wherein a width of the continuous planar bottom surface is greater than the distance between the pair of opposing vertical flanges of the foundation component.

9. The support assembly of claim 7, wherein the continuous planar bottom surface of the bearing base engages the pair of substantially horizontal support surfaces of the pair of bearing support brackets.

10. The support assembly of claim 1, wherein each of the pair of bearing support brackets comprise:
    a planar top surface providing one of the pair of substantially horizontal support surfaces to which the bearing base couples;
    a planar foundation surface defining one or more mounting holes configured to accept a corresponding one or more fasteners, the planar foundation surface securable to a corresponding flange of the foundation component via the one or more fasteners, the planar foundation surface being orthogonal to the planar top surface; and
    a pair of planar side surfaces, the pair of planar side surfaces joined orthogonally to the planar foundation surface and the planar foundation surface.

11. The support assembly of claim 10, wherein the planar top surface defines one or more mounting holes configured to accept a corresponding one or more fasteners to couple the bearing base to each of the pair of bearing support brackets.

12. The support assembly of claim 1, further comprising:
    a second bearing assembly configured to receive and couple to the elongated torque tube, the second bearing assembly further enabling rotation of the elongated torque tube about the torque tube's lengthwise axis;
    a second bearing base configured to receive at least a portion of the second bearing assembly;
    a second foundation component comprising an interconnected second pair of opposing vertical flanges; and
    a second pair of bearing support brackets, each of the second pair of bearing support brackets configured to attach to a corresponding opposing vertical flange of the second pair of opposing vertical flanges, the second pair of bearing support brackets providing a second pair of substantially horizontal support surfaces for the bearing base.

13. A solar tracker support assembly comprising:
    a tracker bearing assembly;
    a portion of tracker torque tube received within the tracker bearing assembly;
    a pair of bearing support brackets; and
    a foundation portion, the foundation portion providing a pair of opposing flanges; and
    wherein each bearing support bracket of the pair of bearing support brackets is attached to one of the opposing flanges of the pair of opposing flanges, the pair of bearing support brackets providing a substantially horizontal support platform for the tracker bearing assembly, the support platform having a width greater than a distance between the pair of opposing flanges.

14. The solar tracker support assembly of claim 13, wherein each of the pair of bearing support brackets couples to an outward surface of a flange of the pair of opposing flanges; and wherein each of the pair of bearing support brackets faces away from its corresponding opposing flange of the foundation portion.

15. The solar tracker support assembly of claim 13, wherein the tracker bearing assembly includes a concentric bearing.

16. The solar tracker support assembly of claim 13, wherein the foundation portion defines a series of holes on each opposing flange, each of the series of holes being elongated about a vertical axis and enabling vertical adjustment of each bearing support bracket relative to its corresponding opposing flange of the foundation portion, the vertical adjustment enabling the pair of bearing support brackets to provide the substantially horizontal support platform for the tracker bearing assembly.

17. A solar tracker support system comprising:
a first plurality of tracker bearing assemblies;
an elongated torque tube coupled to the first plurality of tracker bearing assemblies;
a second plurality of bearing support brackets, each bearing support bracket comprising a pair of joined orthogonal surfaces; and
a third plurality of foundations supporting the first plurality of tracker bearing assemblies, each of the foundations comprising a pair of opposing vertical flanges, wherein one of the second plurality of bearing support brackets is attached to each flange of the pair of opposing vertical flanges via a first one of the pair of joined orthogonal surfaces, the second of the pair of joined orthogonal surfaces providing a pair of substantially horizontal support surfaces for one of the tracker bearing assemblies of the first plurality of tracker bearing assemblies.

18. The solar tracker support system of claim 17, wherein each of the first plurality of tracker bearing assemblies includes a continuous planar bottom surface; and
wherein each of the pair of substantially horizontal support surfaces of each of the second plurality of bearing support brackets engages with a corresponding continuous planar bottom surface of each of the first plurality of tracker bearing assemblies.

19. The solar tracker support system of claim 17, wherein each of the first plurality of tracker bearing assemblies comprise a bearing base and a bearing cap, the bearing cap coupled to the bearing base via one or more fasteners, the bearing base and the bearing cap defining an opening into which the elongated torque tube is located, one or both of the bearing base and the bearing cap coupling to the elongated torque tube.

20. A solar tracker support assembly comprising:
a foundation having an upper portion comprising a pair of opposing flanges interconnected by a web;
a pair of right-angle brackets, wherein one bracket of the pair of right-angle brackets is attached to each flange of the pair of opposing flanges, the pair of right-angle brackets providing a pair of substantially horizontal bearing supports that extend outward from a center of the web;
a tracker bearing seated on the pair of substantially horizontal bearing supports; and
a portion of a torque tube movably supported by the tracker bearing.

21. The solar tracker support assembly of claim 20, wherein the tracker bearing comprises a bearing base and a bearing cap, the bearing cap configured to removably couple to the bearing base to secure the torque tube within a space defined by the bearing base and the bearing cap.

* * * * *